Patented May 26, 1925.

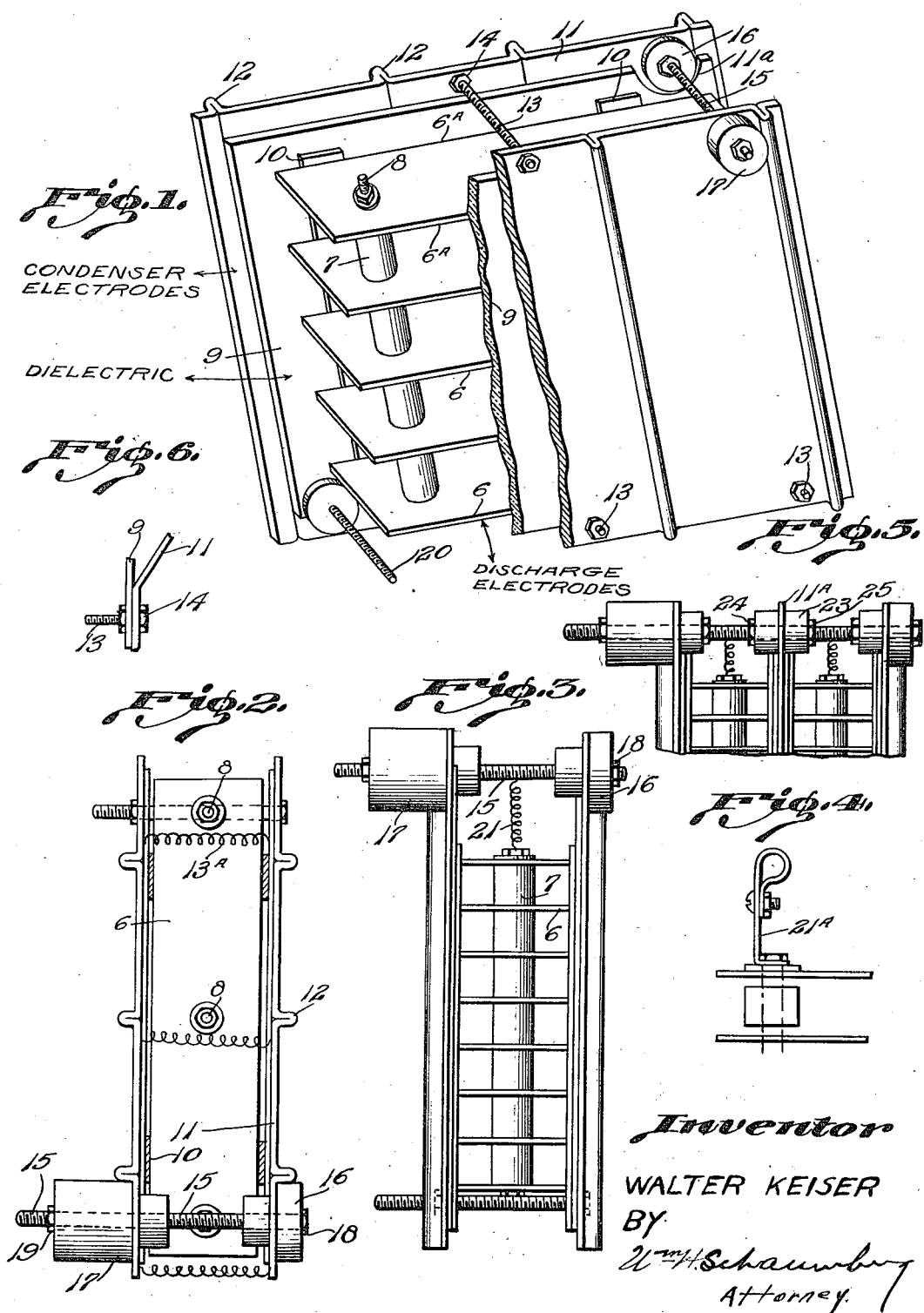

1,539,419

UNITED STATES PATENT OFFICE.

WALTER KEISER, OF ST. LOUIS, MISSOURI, ASSIGNOR TO THE AIR CONDITIONING AND ENGINEERING CO., OF ST. LOUIS, MISSOURI.

OZONE-GENERATING UNIT AND METHOD OF REGULATING THE AIR GAP THEREIN.

Application filed August 6, 1923. Serial No. 656,066.

*To all whom it may concern:*

Be it known that I, WALTER KEISER, a citizen of the United States, residing in the city of St. Louis and State of Missouri, have invented a new and useful Ozone-Generating Unit and Method of Regulating the Air Gap Therein, of which the following is a specification.

My invention relates to ozone generating devices and more particularly the open and air cooled type. The object of my invention is to provide an ozone generating unit which is compactly constructed, selectively variable in capacity and also adapted to be combined with other units of like size and construction in order to meet requirements in excess of the maximum capacity of the single unit. Another and further object of my invention is to provide an ozone generating unit from which the heat which is produced in the generation of ozone by electricity is quickly dissipated. Still further objects of my invention are to provide an ozone generating unit that may be readily cleaned while in operative position without being taken apart, which is durable and can be manufactured with a minimum expenditure of labor and materials.

With these and other objects in view, I will now describe my invention, reference being had to the accompanying drawings, in which:

Fig. 1 is a perspective view of my device with a portion of one of the side walls cut away to show in detail the construction of the ozone producing members; Fig. 2 is a top plan view showing a modified form for holding the electrodes in operative position; Fig. 3 is an end view; Fig. 4 shows a modified form of terminal connector; Fig. 5 is a view of combined units; and Fig. 6 is a fragmentary, side view of a modified form of side-wall and dielectric.

In my device I employ a grid form of discharge electrode which consists of a plurality of plates 6, spacers 7 and bolts 8. The plates and spacers have openings therein through which the bolts 8 are passed in order to hold the assembly together in compact form. A sufficient number of these bolts are used to prevent distortion of the grid when assembled and to keep the plates and spacers in electrical contact. These bolts may be used for electrical terminals, as shown in Figs. 3, 4 and 5.

The plates 6 are preferably of aluminum or any metal adapted to resist the corrosive action of ozone and have discharge edges $6^a$ which are preferably continuous and unbroken, as shown in the drawings. By preference the plates are relatively wide, thereby providing a means for quickly radiating any heat that may be generated while ozone is being produced. While I have shown and prefer to make these plates flat, I do not wish to be limited thereto as it is obvious that they can be made in various forms and shapes, as, for instance, corrugated, in order to furnish a greater radiating surface.

The spacers 7 are preferably cylindrical in form as thereby any undesirable leakages and discharges which might occur from sharp edges are reduced to a minimum and cleaning of the grid is thereby also facilitated. These spacers are of ample diameter to provide suitable support for the plates, insure electrical contact between the various plates and prevent the distortion thereof at the points of contact with the spacers when the bolts 8 are drawn up.

By increasing or decreasing the number of plates 6 and using spacers 7 of suitable height, I am able to vary the amount or volume of ozone which the unit produces and still keep the size of the discharge grid within any desired limits. Furthermore, this construction permits easy assembly or disassembly and facilitates the replacement of any defective or undesirable part.

As shown in the drawings, I provide dielectrics 9 of suitable material, preferably mica or glass, positioned adjacent discharging edges $6^a$ of the plates and prevented from coming into contact with said edges by means of strips of dielectric material 10. These dielectrics 9 are preferably flat sheets substantially co-extensive with the adjacent condenser electrodes 11 and are provided with notches $11^a$ engaging the insulators 16 and 17 which prevent the dielectric from slipping from the desired position or being unintentionally displaced. The strips 10 are also used to maintain an air gap between the discharge electrode and the dielectric, and by changing the thickness thereof and adjusting the bolts 13 or springs $13^a$ the air gap may be selectively varied. In order to prevent any discharge or leakage along these strips from the grid to the condenser electrode, I prefer that they do not extend beyond the outside plates of the discharge electrode, or, as shown in Fig. 6, I may bend back the electrode 11 away from the dielectric 10.

11 are condenser electrodes, preferably formed of noncorrosive material, such as some suitable metal, and serve as side walls for the ozone generating unit and as supports for the dielectrics. Reinforcing ribs 12 may be formed on the outer face. By preference these ribs 12 are positioned so that they will be at an angle to the trend of the discharge plates 6 as they thereby tend to prevent such accidental or unintentional alteration, variation or distortion in the predetermined air gap as might occur if the lock nuts 14 are improperly adjusted or the stay bolts 13 improperly drawn up. The inner face of the condenser electrode 11 is in contact with the dielectric 9. 13 are stay bolts provided with lock nuts 14 and are used to assemble the condenser electrodes, adjust the distance between them, and to provide the necessary pressure to retain the discharge electrode in operative position. They also act as conductors between the condenser electrodes. By the use of these bolts, lock nuts and the strips 10, I can establish and maintain an air gap of any desired width between the discharge electrode and the dielectric. 15 is a stay bolt which may be used as a terminal for connecting the plates 6 with a source of electrical energy and is preferably insulated from the electrode 11 by insulators 16 and 17. 16 and 17 are preferably shouldered insulators, the reduced portion of which projects through a suitable opening in the side wall. The enlarged portion bears against the outer face of the side wall and is of suitable length and diameter to prevent flashing over between it and the nuts 18 and 19 when the bolt 15 is drawn up. The reduced portion of the insulator is of suitable length and diameter to prevent flashing over between the terminal 15 and the side wall.

20 is a stay bolt adapted to be used as a terminal to connect the condenser electrode 11 to a source of electrical energy and thus complete the circuit between it and the terminal 15. 21 is a connector of any suitable conductive material between the terminal 15 and plates 6 and is preferably connected to one of the bolts 8. I have shown this in the form of a spring, but any suitable form may be used and in Fig. 4 I show a modified form 21ª, which consists of a strip of metallic material, the ends of which are bolted to the terminals 8 and 15.

In Fig. 2 I show springs 13ª, which may be used instead of the stay bolts 13, shown in Fig. 1. These springs are preferably used when glass is employed as a dielectric, as thereby elasticity is provided to compensate for the expansion of the glass caused by heat produced in the process of ozone generation. By using strips 10 of suitable thickness I am able to vary at will the distance between the electrodes 11 and regulate the tension of the springs 13ª.

When several of my devices are combined, as shown in Fig. 5, I prefer to use shouldered insulators 16 and 17 on only the two outer condenser electrodes and to use on intermediate condenser electrodes an insulator 23 which is uniform in diameter and projects through a suitable opening in the intermediate condenser 11ª. These insulators are of sufficient diameter and length to prevent flashing over between the nuts 24 and 25 and the condenser 11ª. The nuts 24 and 25 may be used to keep the insulator in a properly centered position.

I claim:

1. In an ozone generating device, a flat dielectric and a flat separable support therefor, said support comprising an electrode.

2. In an ozone generating device, a flat dielectric and a separable support therefor comprising an electrode, said support having an uninterrupted flat surface adjacent said dielectric.

3. In an ozone generating device, a flat dielectric and a removable support therefor comprising an electrode, said dielectric and said support having uninterrupted contacting surfaces.

4. In an ozone generating device, electrodes, a dielectric and means for maintaining said dielectric in operative relation with said electrodes, which means comprise said electrodes.

5. An ozone generating device, comprising a discharge electrode, a dielectric, a condenser electrode and means for maintaining said elements in operative relation, which means comprises one of the electrodes.

6. An ozone generating device comprising a discharge electrode, a dielectric, a condenser electrode and means for maintaining the discharge electrode in operative position, which means comprises the condenser electrode.

7. In an ozone generating device, an electrode, flat dielectrics disposed on opposite sides of said electrode in operative relation with edges of said electrode and detachable supports for said dielectrics which comprise the other electrode.

8. In an ozone generating device, an electrode, flat dielectrics oppositely disposed relative to said electrode and in operative relation with edges of said electrode and mechanically and electrically connected supports for said dielectrics, which supports comprise the other electrode.

9. In an ozone generating device, an electrode, oppositely disposed dielectrics relative to said electrode and in operative relation with edges of said electrode, supports of conductive material for said dielectrics and means for electrically connecting said supports to form the other electrode.

10. In an ozone generating device, an electrode disposed between flat dielectrics and having edges opposed to the surfaces of the dielectrics, supports for said dielectrics, said supports being of conductive material, means for connecting said supports and for maintaining said electrode, dielectrics and supports in operative relation and for electrically connecting said supports to form the other electrode.

11. An ozone generating device having an air gap between one electrode and the dielectric and means for selectively varying said air gap.

12. In an ozone generating device, oppositely disposed dielectrics relative to a discharge electrode and means for selectively varying the distance between said dielectrics.

13. An ozone generating device comprising a dielectric, a pair of electrodes and means for selectively varying the distance between the electrodes.

14. In an ozone generating device, a discharge electrode and means for maintaining said electrode in operative relation with the condenser electrode.

15. In an ozone generating device, a flat, detachable dielectric and means for retaining said dielectric in operative position between the electrodes.

16. In an ozone generating device, a condenser electrode which comprises an outer wall for said device, means for stiffening said wall comprising a rib formed integral with said wall.

17. In an ozone generating device, a discharge electrode and a condenser electrode in operative relation therewith, a dielectric intermediate said electrodes facing and in intimate contact with the condenser electrode, an air gap between the dielectric and the discharge electrode, means for preventing distortion of said air gap which means comprises a rib in the condenser electrode positioned at an angle relative to the trend of the discharge electrode.

18. In an open ozone generating device, a pair of substantially flat electrically and mechanically connected side walls which comprise an electrode.

19. In an open ozone generating device, a pair of electrically and mechanically connected side walls having substantially flat surfaces opposed to each other, and a dielectric and an electrode intermediate thereof.

20. In an open ozone generating device, a pair of reinforced side walls adapted to form an electrode.

21. In an ozone generating device, the combination of a pair of electrodes, one electrode comprising a plurality of separable spaced plates of conductive material which are electrically and mechanically connected, the other electrode comprising a plurality of separable plates of conductive material and means for mechanically and electrically connecting said plates and for maintaining said plates in spaced relation, said plates being reinforced and adapted to form side walls for the device, flat removable dielectrics, intermediate and supported by said side walls and having one surface in contact with a surface of one electrode and another surface opposed to the edges of the plates of the other electrode, means for preventing the displacement of said dielectrics, means for maintaining an air gap between said dielectrics and one electrode which means comprise strips of dielectric material intermediate said dielectrics and said electrode.

22. In an open ozone generating device having an electrode, side walls united by adjustable elements, a dielectric and a strip of dielectric material interposed between said electrode and said dielectric to provide an air gap, means for regulating the air gap between the dielectric and the electrode, which means comprises said strip of dielectric material interposed between the electrode and the dielectric and the adjustable elements which unite the side walls.

WALTER KEISER.